July 20, 1954      E. G. VANDERLIP      2,684,212

DISK ROTOR WITH RETRACTING BLADES FOR CONVERTIBLE AIRCRAFT

Filed Oct. 31, 1951      2 Sheets-Sheet 2

INVENTOR.

Edward G. Vanderlip

Patented July 20, 1954

2,684,212

UNITED STATES PATENT OFFICE 2,684,212

DISK ROTOR WITH RETRACTING BLADES
FOR CONVERTIBLE AIRCRAFT

Edward G. Vanderlip, Radnor, Pa., assignor to
Piasecki Helicopter Corporation, Morton, Pa.

Application October 31, 1951, Serial No. 253,995

3 Claims. (Cl. 244—7)

This invention relates to aircraft and in particular to a type of aircraft that utilizes a rotary wing system for takeoffs, hovering and slow speed translational flight and a fixed wing and propeller or jet for high speed forward translational flight.

The important advance which underlies this invention is in providing a rotary wing system which includes a large circular plan form disc of airfoil cross section and a plurality of rotor blades extendable from or retractable within the hollow of said disc. The aircraft is converted to a high speed fixed wing type of aircraft by retracting the rotor blades within the disc without stopping rotation of the disc; and is converted to a rotary wing aircraft when the rotor blades are extended radially from said disc and the disc is rotated by jets or a powerplant. The disc constitutes the hub of the rotor wing system and functions as a fixed wing of a conventional fixed wing aircraft. The area of the disc is great enough to develop a lift that will sustain the aircraft at high forward speeds and at lower speeds used during conversion from one type of operation to the other.

The main object of this invention is to provide an aircraft capable of conversion while in flight from a rotary wing aircraft to a fixed wing aircraft or vice versa without any dissymmetry of lift being produced by the rotor system during conversion.

Another object of this invention is to provide common operating means in an aircraft which change the thrust vector of the rotary wing system in rotary wing flight and change the roll and pitch of the aircraft in fixed wing flight.

Another object of this invention is to provide a rotary wing system which includes a hub in the form of a large hollow disc, and a plurality of rotor blades carried by said disc and retractable within said disc.

Another object of this invention is to provide an aircraft having a rotary wing system which includes a large disc of circular plan form and having airfoil characteristics which has an external area of such magnitude that the lift developed by said disc at predetermined forward speeds of flight will sustain the aircraft during conversion from a fixed wing type of aircraft to a rotary winged type of aircraft.

Another object of this invention is to provide means for retracting the blades of the rotor within the hollow disc against the action of centrifugal forces on the blade.

Another object of this invention is to provide roll and pitch control means for the aircraft by inclining the disc of the rotor about axes parallel to the roll and pitch axes respectively of the aircraft.

A further object of this invention is to provide means for changing the pitch of a plurality of retractable rotor blades collectively to provide means for changing the vertical thrust of the rotor.

A further object of this invention is to provide an aircraft capable of vertical, hovering, and slow flight by one type of sustaining means and capable of sustained flight in a higher speed range by the use of a second sustaining flight means and a means of controlling said aircraft during both modes of operation.

A further object of this invention is the provision of a rotating lift system for use in convertible type aircraft propelled by a powerplant contained wholly within the rotating lift system.

These and other advantages will be clearly understood by referring to the drawings in which:

Figure 3 is a diagrammatic plan view of a segment of the disc showing jet means for rotating the disc.

In the accompanying drawings, the fuselage of my present invention is designated by numeral 10 of suitable construction and shape to accommodate the pilot, engine, and necessary controls. An engine 43 is located in the forward section of the aircraft and drives a tractor propeller 44 for propulsion during conversion and higher forward speeds of the aircraft. A control 45 is shown connected to the throttle control of the engine to regulate the power transmitted to the propeller 44. Although a conventional engine has been shown, this invention also contemplates the use of a jet engine in lieu thereof.

Figure 2:
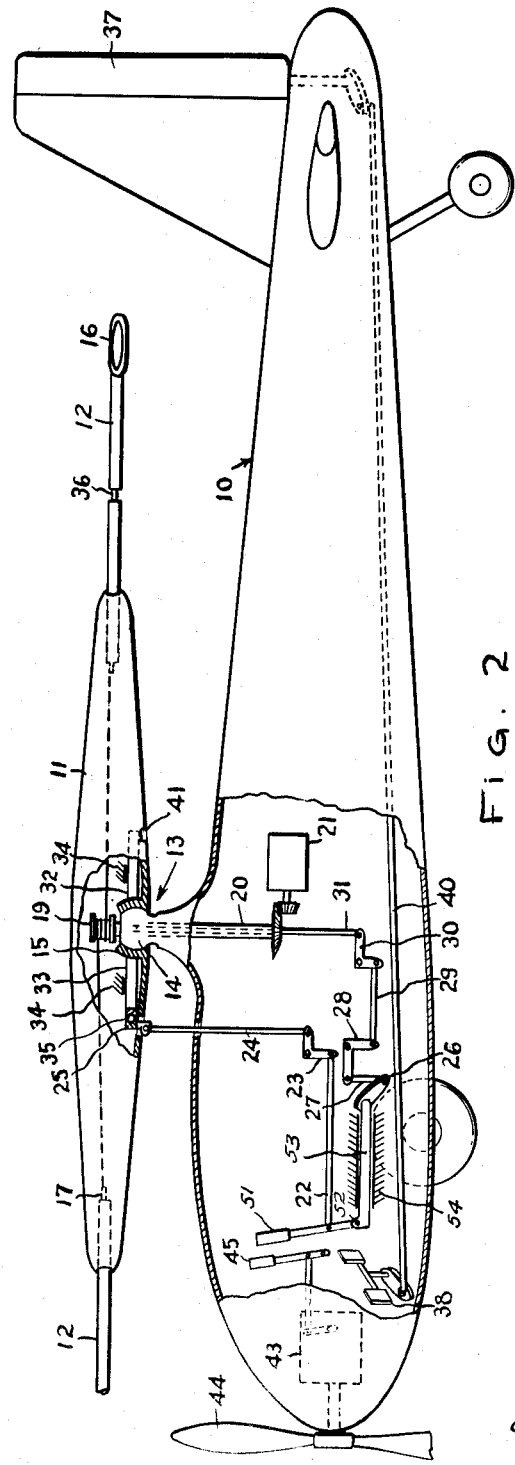
Figure 2 is a diagrammatic elevational view of said aircraft shown partially in section.

The rotor system of the aircraft embodied in this invention includes a disc 11 mounted above the fuselage 10 and is mounted so as to rotate about a substantially vertical axis. A pair of rotor blades 12 of airfoil cross-section are carried by the disc in a manner to be presently described. Two rotor blades are shown in the drawings but it is possible to vary this number. The disc 11 is circular in plan form, is hollow, and has its edge aerodynamically faired as seen in Figure 2.

The disc is mounted on the fuselage 10 by means of a universal joint 13. A truncated spherical hollow ball portion 14 extends upwardly from the top surface of fuselage 10 and is received within a complemental socket portion 15 formed as an integral portion of the disc. The rotational driving means for said disc comprises a series of jets 16 faired into the tips of rotor blades 12. The disc is of such size that fuel for the jets can be housed within said disc. The details of the fuel system and means for regulating the throttle adjustment of the blade tip jets have not been shown, since they are considered not to be a part of the present invention.

While the preferred embodiment of this invention shows jet driven rotor blades, the rotary wing system can be shaft driven, or driven as shown in the modification of Figure 3 wherein disc 11 is driven by a series of jets 46 retractable within the edge of the disc. These jets can be spaced at intervals around the periphery of the disc and retracted within the disc during high speed forward flight.

The mechanism for retracting the rotor blades 12 within the disc 11 comprises a cable and pulley system. The root end of each blade has a fitting 17 to which is secured one end of a cable 18; the other end thereof is secured to a pulley block 19 which in turn is rotatably driven by a shaft 20, powered by motor 21. By inspection it is seen that rotation of pulley block in a clockwise direction will retract the blades 12 whereas counterclockwise rotation will permit the blades to extend radially from the periphery of the disc by action of centrifugal forces generated by the blades when the disc is rotated during conversion for fixed wing flight to rotary wing flight.

After the blades are extended the cables 18 will continue to drive the pulley 19 and the motor 21 will be permitted to free wheel or if desired an overrunning clutch may be used. Initial rotation of the disc to extend the blade can be accomplished by either shaft driving the disc from the engine 43 or using auxiliary jets that can be extended from the disc such as shown in Fig. 3.

In the arrangement illustrated in Figure 2 control of the aircraft about its roll and pitch axes is obtained by tilting the disc 11 in the appropriate direction. The mechanism for tilting the disc includes a control column 51 pivoted at 52 for fore and aft movement on torque tube 53 supported in bearings 54. Fore and aft movement of the control column 51 imparts movement to push-pull rod 22 to the vertical arm of bellcrank 23. The horizontal arm of said crank 23 is connected by means of a vertical link 24 to the outer non-rotating ring 25 of a swash plate 32. Lateral movement of control column 51 is transmitted by torque tube 20 and crank 26 through link 27, bellcrank 28, push-pull rod 29 to the vertical arm of bellcrank 30. The horizontal arm of said crank 30 is connected by vertical link 31 to outer ring 25, 90 degrees around the periphery of said ring from the connection of said ring with the aforementioned vertical link 24. Swash plate 32 includes an inner ring 33 which is rigidly affixed to internal structure of disc 11 as at 34 and rotates therewith. The rings 25 and 33 are maintained in permanent concentric relation but are movable with respect to each other about their common axis.

Ball bearings 35 are positioned between interfaces of the rings. A circular slot 41 in the base of disc 11 provides clearance for the vertical links 24 and 31 which are attached to the non-rotative ring 25 of swash plate 32. Thus it is seen that fore and aft and lateral movement of control column 51 imparts universal rocking motion to the rotor hub or disc 11.

This invention further contemplates the incorporation of a pitch changing mechanism for the rotor blades. This mechanism can be of any conventional type; but for the sake of simplicity an automatic pitch mechanism of the type shown and described in Patent Number 2,074,805 of March 23, 1937 is to be installed and suitably modified for jet operation of blades 12 as at 36. The mechanism 36 provides automatic means for varying the pitch of the blades of the rotor which will be responsive to the driving torque developed by jets 16, thus automatically varying the thrust and the rotative resistance of the rotor according to the manner in which the jets are throttled.

Directional control of the aircraft during fixed wing flight is provided by rudder 37 which is connected by push-pull links 40 to rudder pedals 38 for operation in a conventional manner.

Directional control of the aircraft during rotary wing flight is not shown as it can be obtained in a number of ways such as vanes mounted so as to be in the downwash of the rotor. Counter torque propellers driven by suitable means such as the engine driving the tractor propeller and being provided with a clutch so as to provide power to the counter torque propeller during rotary wing flight and power to the tractor propeller during fixed wing flight. Another method of providing yaw control would be through use of changing the direction of a jet propulsion means in such a manner that yaw control is provided in rotary wing flight and jet propulsion in fixed wing flight.

*Operation*

Figure 1:
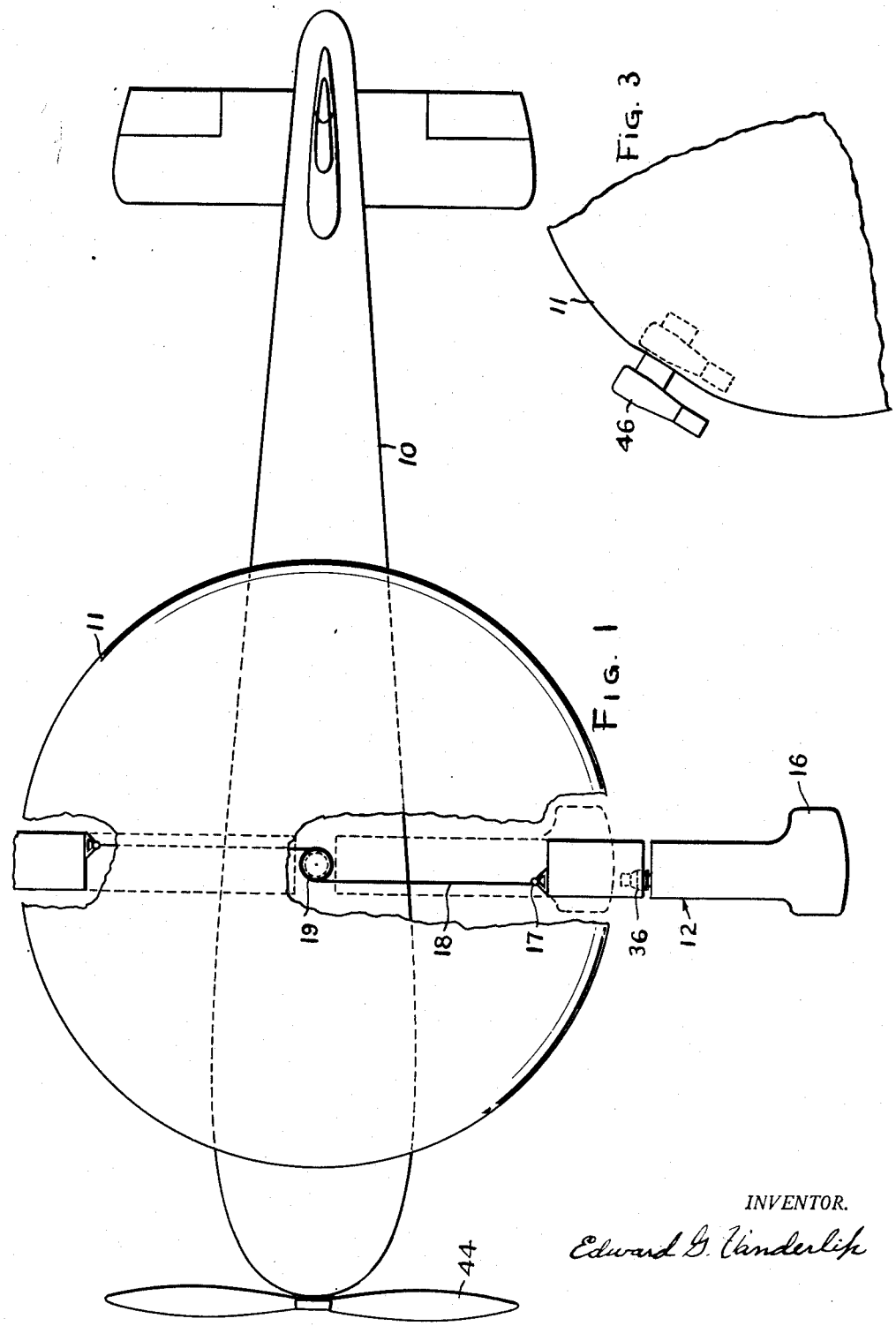
Figure 1 is a diagrammatic plan view of the aircraft of this invention.

Let it be assumed that the above described controls are incorporated in the helicopter of the type shown in Figure 1 and that the aircraft is at rest on the ground with the disc being rotated with the pitch of the rotor blades too low to cause the helicopter to rise. In order to take off vertically from the ground it is only necessary to open the jet throttle. During this time the engine 43 and tractor propeller 44 are operated at idling speed. As the driving torque increases in response to the jet thrust, the blades of the disc advance and their pitch angles increase to the best thrust setting. As the rotor attains its rated speed the helicopter will leave the ground and rise vertically, or in an inclined path as determined by the inclination of the hub or disc.

Having gained the desired altitude, the pilot may cause the helicopter to move laterally by moving control column in the appropriate direction. Movement of control column to the right, for example, will cause the disc to tilt to the right, thereby tilting the thrust vector developed by the rotor to the right with a resultant horizontal component in that direction.

To convert the aircraft to a fixed wing flight condition the rotor disc is inclined forwardly to obtain a resultant horizontal forward thrust component of speed. The speed of the engine 43 which drives propeller 44 is increased to supplement and reinforce the effects of the rotor system. Upon reaching a predetermined forward speed, disc 11 develops sufficient lift to sustain the aircraft in flight independently of the lift produced by rotor blades 12. At this point motor 21 is used to retract the rotor blades 12 by means of cables 18 and pulley 19 and simultaneously the throttle of engine 43 is opened wider to increase the forward speed of the aircraft. As distinguished from other aircraft which combined helicopter flight with fixed wing flight, it is readily observed that substantially no dissymmetry of lift is encountered as the rotation of the rotor is stopped and the aircraft is converted to high speed forward flight condition.

To reverse the process by converting the aircraft from a fixed wing flight condition to a rotary wing flight condition the following procedure is followed: The forward speed of the aircraft is slowed down to a predetermined speed range. The disc 12 is rotated and the blades extended so as to provide lift sufficient to sustain the aircraft. As the rotation of disc 12 is brought up to its rated speed the throttle of engine 44 is slowly closed thus providing a smooth transition from fixed wing flight characteristics to rotary wing flight.

While I have shown one embodiment of my invention, it is to be understood that it is susceptible to those modifications which appear within the spirit of the invention and the scope of the appended claims.

I claim:

1. An aircraft comprising in combination, a fuselage having an empennage and forward propulsive means, a disc-shaped airfoil mounted on said fuselage for universal inclination thereon, means for rotating said airfoil, a plurality of rotary wing blades mounted for rotation with said disc-shaped airfoil, and means for retracting said blades into said airfoil and for extending said blades outside of said airfoil.

2. In an aircraft a lifting surface universally mounted upon an airframe, forward propulsive means mounted on said aircraft, a plurality of rotary wing blades supported on said lifting surface, means for rotating said lifting surface, means for tilting said lifting surface with respect to the axis of rotation of said lifting surface, means for retracting said blades into said lifting surface and for extending said blades outside of lifting surface, said lifting surface operable as a fixed wing when said blades are retracted, said surface operable as a rotor hub when said blades are extended, said lifting surface developing forward thrust when said blades are rotated and are being retracted and extended.

3. An aircraft comprising in combination, a fuselage having an empennage and forward propulsive means, a disc-shaped airfoil mounted on said fuselage for universal inclination thereon, means for rotating said airfoil, a plurality of rotary wing blades mounted for rotation with said disc-shaped airfoil, and means for retracting said blades into said airfoil and for extending said blades outside of said airfoil, and means mounted in the fuselage and operably connected to said rotatable disc shaped airfoil for universally tilting said airfoil with respect to the normal axis of rotation of the said airfoil, wherein said means for tilting said airfoil is operable to change the inclination of the thrust vector developed by said airfoil and said rotor blades when said blades are extended, and to change the attitude of the aircraft about its roll and pitch axes when said rotor blades are retracted.

References Cited in the file of this patent

UNITED STATES PATENTS

| Number | Name | Date |
|---|---|---|
| 988,523 | Toles | Apr. 4, 1911 |
| 1,742,715 | Newborn | Jan. 7, 1930 |
| 1,841,642 | Sellmer | Jan. 19, 1932 |
| 1,932,702 | Langdon | Oct. 31, 1933 |
| 2,054,610 | Volpicelli | Sept. 15, 1936 |
| 2,074,805 | Platt | Mar. 23, 1937 |
| 2,464,285 | Andrews | Mar. 15, 1949 |
| 2,632,998 | Burch | Mar. 31, 1953 |